United States Patent
Beck et al.

(10) Patent No.: US 10,789,780 B1
(45) Date of Patent: Sep. 29, 2020

(54) ELIMINATING A PROJECTED AUGMENTED REALITY DISPLAY FROM AN IMAGE

(71) Applicant: Konica Minolta Laboratory U.S.A., Inc., San Mateo, CA (US)

(72) Inventors: David Beck, Lake Mary, FL (US); Kevin Beck, Lake Mary, FL (US); Ronald O'Farrell, Lake Mary, FL (US); Jason Grams, Westminster, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 16/370,065

(22) Filed: Mar. 29, 2019

(51) Int. Cl.
*G06T 19/00* (2011.01)
*G06T 17/00* (2006.01)
*G06T 11/00* (2006.01)
*G06T 11/60* (2006.01)

(52) U.S. Cl.
CPC .......... *G06T 19/006* (2013.01); *G06T 11/008* (2013.01); *G06T 11/60* (2013.01); *G06T 17/00* (2013.01)

(58) Field of Classification Search
None
See application file for complete search history.

(56) References Cited

U.S. PATENT DOCUMENTS

| | | | |
|---|---|---|---|
| 5,847,709 A * | 12/1998 | Card | G06F 3/04815 715/850 |
| 5,923,324 A * | 7/1999 | Berry | G06F 3/04815 715/852 |
| 7,139,982 B2 * | 11/2006 | Card | G06F 3/04815 715/786 |
| 8,045,060 B2 | 10/2011 | Cole et al. | |
| 8,845,110 B1 | 9/2014 | Worley, III | |
| 8,907,982 B2 * | 12/2014 | Zontrop | G06T 19/006 345/633 |
| 9,569,892 B2 | 2/2017 | Diaz Spindola et al. | |
| 9,961,315 B2 | 5/2018 | Junuzovic et al. | |
| 10,417,801 B2 * | 9/2019 | Tan | G06F 3/03547 |
| 2003/0156758 A1 | 8/2003 | Bromiley et al. | |
| 2004/0225968 A1 * | 11/2004 | Look | G06F 40/169 715/778 |
| 2004/0258289 A1 | 12/2004 | Hornegger | |
| 2012/0121146 A1 | 5/2012 | Von Berg | |
| 2012/0262485 A1 | 10/2012 | Raghoebardajal et al. | |

(Continued)

FOREIGN PATENT DOCUMENTS

| | | |
|---|---|---|
| EP | 2945374 A2 | 11/2015 |
| WO | 2014/063724 A1 | 5/2014 |

*Primary Examiner* — Motilewa Good Johnson
(74) *Attorney, Agent, or Firm* — Osha Liang LLP

(57) ABSTRACT

A method for processing an augmented reality (AR) image includes: obtaining an AR workspace image of an AR workspace that includes a document in a first region of the AR workspace and an AR output projection in a second region of the AR workspace; obtaining an internal representation of the AR output projection; masking the AR workspace image of the AR workspace with the internal representation to eliminate the AR output projection in the AR workspace image; and generating, in response to masking the AR workspace image of the AR workspace, a clean version of the AR workspace image in which the AR output projection is eliminated.

20 Claims, 10 Drawing Sheets

(56) References Cited

U.S. PATENT DOCUMENTS

| | | | |
|---|---|---|---|
| 2013/0010068 A1 | 1/2013 | Tiernan et al. | |
| 2013/0140663 A1 | 6/2013 | Fukuda | |
| 2014/0125694 A1* | 5/2014 | Kaplan | G02B 27/01 |
| | | | 345/629 |
| 2015/0179147 A1* | 6/2015 | Rezaiifar | G03B 21/142 |
| | | | 345/625 |
| 2015/0363076 A1 | 12/2015 | Komatsu | |
| 2018/0042692 A1 | 2/2018 | Kim et al. | |
| 2018/0088328 A1* | 3/2018 | Wade | G02B 27/0103 |
| 2018/0293041 A1* | 10/2018 | Harviainen | H04N 13/361 |
| 2019/0129583 A1* | 5/2019 | Yamada | G06F 3/0482 |
| 2019/0371065 A1* | 12/2019 | Anders | G02B 27/0172 |

\* cited by examiner

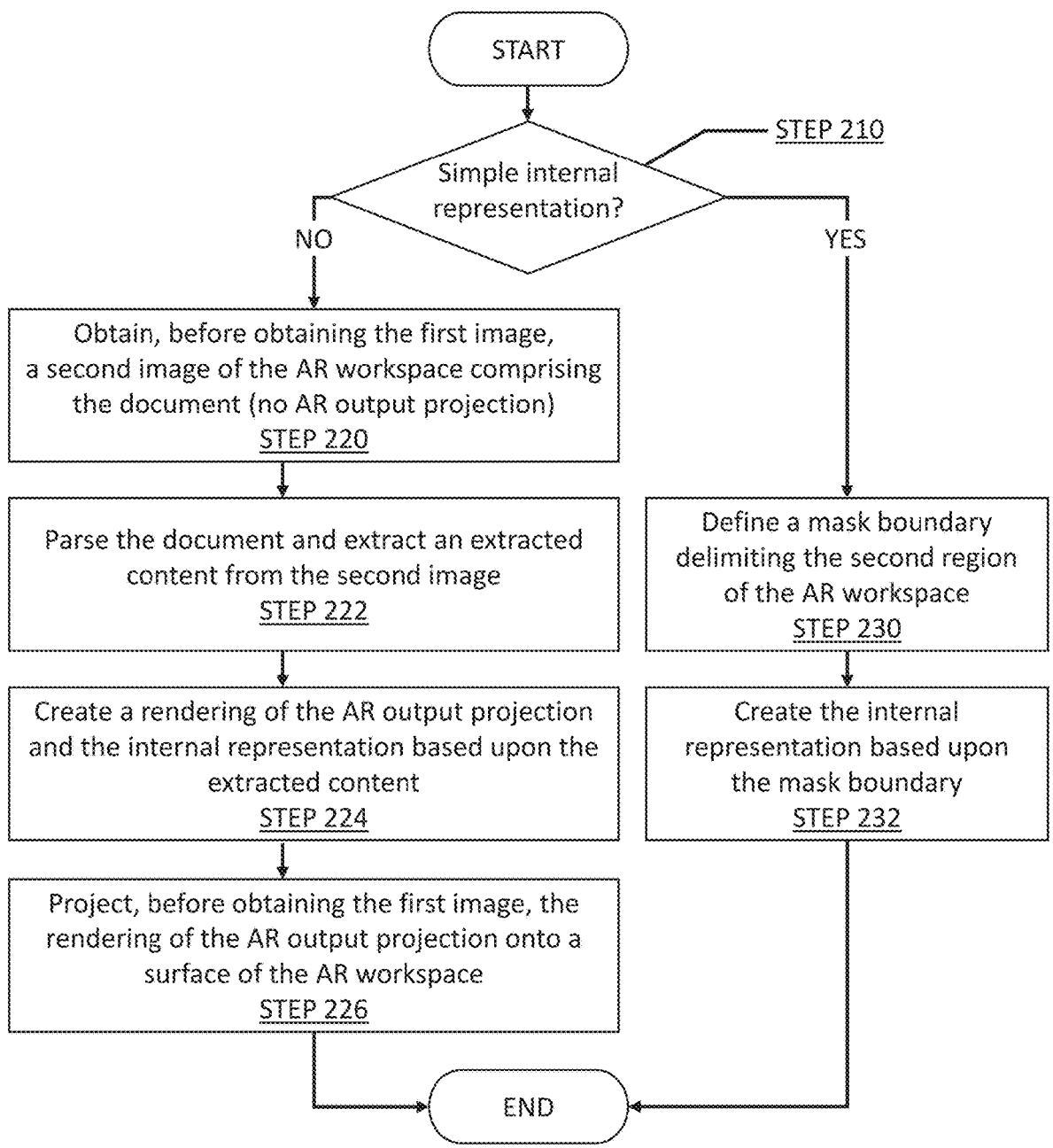

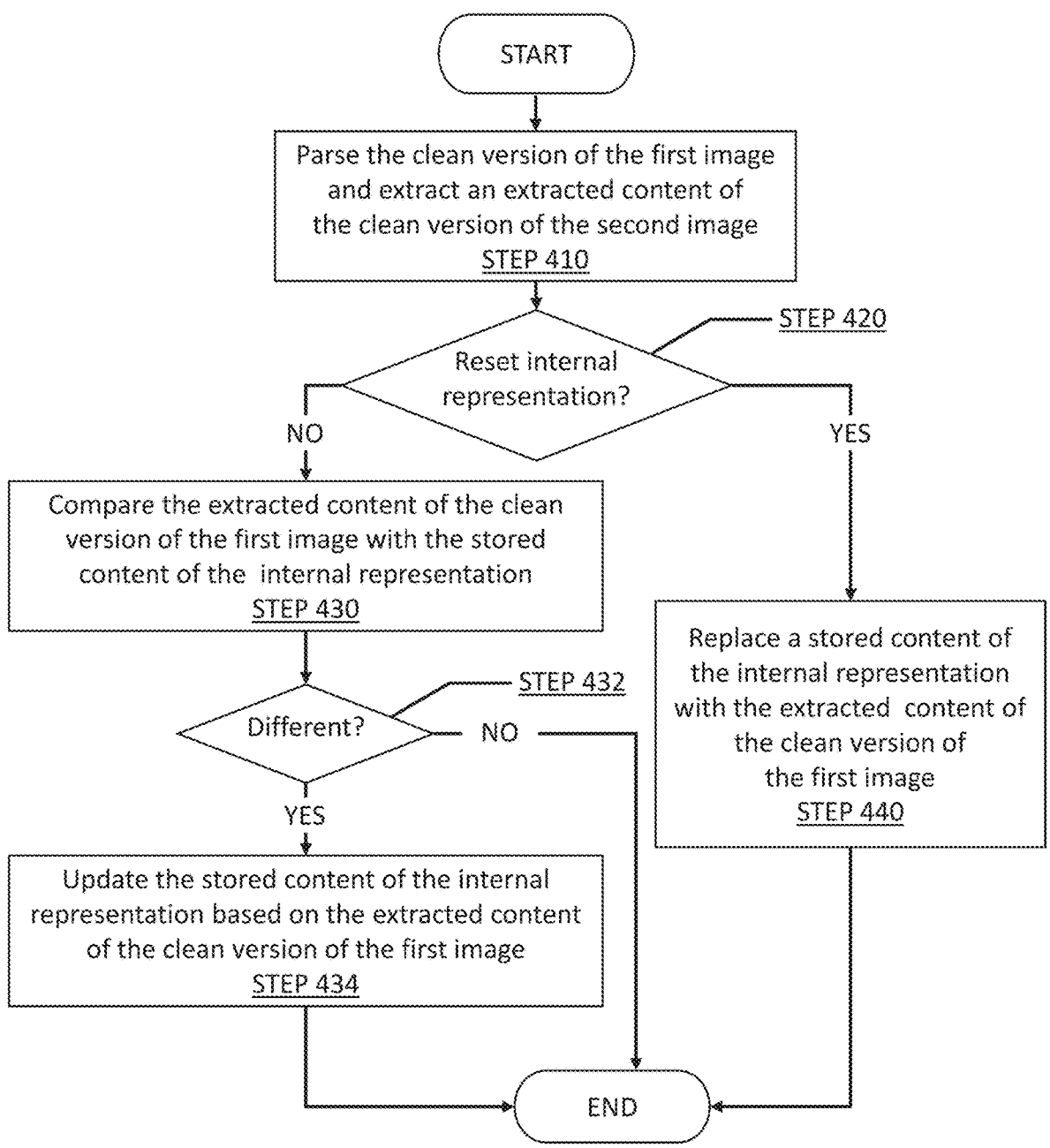

ELIMINATING A PROJECTED AUGMENTED REALITY DISPLAY FROM AN IMAGE

BACKGROUND

Augmented Reality (AR) allows a user to interact with a computer-generated AR output overlaid on or around objects in a real-world environment. In some cases, the computer-generated AR output may be projected into the real-world environment such that the user does not have to hold a smartphone or wear AR glasses. User interaction is improved when the AR output updates in real-time without jarring transitions between capturing the real-world environment and projecting the AR output. For example, a dynamic interactive environment has potential to be quite useful in a business environment.

SUMMARY

In general, one or more embodiments of the invention relate to a method for processing an augmented reality (AR) image. The method comprises: obtaining an AR workspace image of an AR workspace, wherein the AR workspace in the AR workspace image comprises: a document in a first region of the AR workspace; and an AR output projection in a second region of the AR workspace; obtaining an internal representation of the AR output projection; masking the AR workspace image of the AR workspace with the internal representation to eliminate the AR output projection in the AR workspace image; and generating, in response to masking the AR workspace image of the AR workspace, a clean version of the AR workspace image in which the AR output projection is eliminated.

In general, one or more embodiments of the invention relate to a non-transitory computer readable medium (CRM) storing computer readable program code for processing an AR image. The computer readable program code causes a computer to: obtain an AR workspace image of an AR workspace, wherein the AR workspace in the AR workspace image comprises: a document in a first region of the AR workspace; and an AR output projection in a second region of the AR workspace; obtain an internal representation of the AR output projection; mask the AR workspace image of the AR workspace with the internal representation to eliminate the AR output projection in the AR workspace image; and generate, in response to masking the AR workspace image of the AR workspace, a clean version of the AR workspace image in which the AR output projection is eliminated.

In general, one or more embodiments of the invention relate to a system for processing an AR image. The system comprises: a memory; and a processor coupled to the memory. The processor: obtains an AR workspace image of an AR workspace, wherein the AR workspace in the AR workspace image comprises: a document in a first region of the AR workspace; and an AR output projection in a second region of the AR workspace; obtains an internal representation of the AR output projection; masks the AR workspace image of the AR workspace with the internal representation to eliminate the AR output projection in the AR workspace image; and generates, in response to masking the AR workspace image of the AR workspace, a clean version of the AR workspace image in which the AR output projection is eliminated.

Other aspects of the invention will be apparent from the following description and the appended claims.

BRIEF DESCRIPTION OF DRAWINGS

FIGS. 2A-2D show flowcharts in accordance with one or more embodiments of the invention.

DETAILED DESCRIPTION

Figure 1:
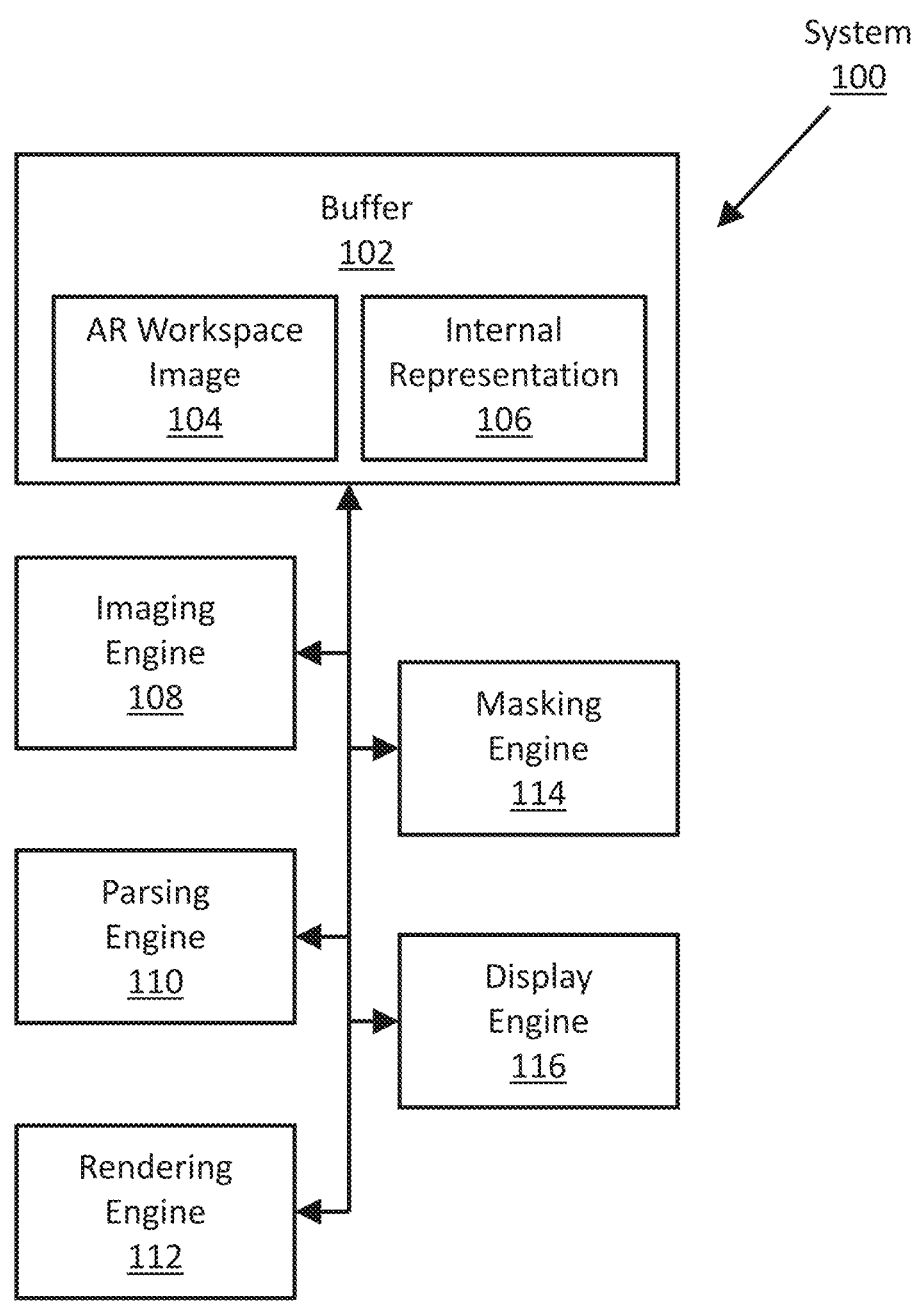
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

In general, embodiments of the invention provide a method, a non-transitory computer readable medium (CRM), and a system for processing an augmented reality (AR) image.

FIG. 1 shows a system (100) in accordance with one or more embodiments of the invention. As shown in FIG. 1, the system (100) has multiple components, and may include, for example, a buffer (102), an imaging engine (108), a parsing engine (110), a rendering engine (112), a masking engine (114), and a display engine (116). Each of these components (102, 108, 110, 110, 112, 114, and 116) may be located on the same computing device (e.g., a personal computer (PC), laptop, tablet PC, smartphone, multifunction peripheral, kiosk, server, PIC device) or on different computing devices connected by a network of any size having wired and/or wireless segments. Each of these components is discussed below.

The buffer (102) may be implemented in hardware (i.e., circuitry), software, or any combination thereof. The buffer (102) is configured to store an AR workspace image (104) and an internal representation (106) of an AR output projection. Multiple AR workspace images (104) or internal representations (106) may be stored in the buffer (102).

The AR workspace image (104) is an image of an AR workspace. The AR workspace may be a surface of any type (e.g., a desk, a wall, a whiteboard, a floor). Further, the AR workspace may comprise multiple work surfaces, irregular surfaces, or spatially separated surfaces, but is not particularly limited to these configurations. Accordingly, the AR workspace image (104) may be a single image or multiple images.

In one or more embodiments, the AR workspace comprises a first region with a document. The content of the document may comprise a text character, a non-text character, a string of text, a raster image, a vector image, a graph, or a table, but is not particularly limited to these contents. The content may be computer-generated, typed, or handwritten, but is not particularly limited to these methods of generation. Accordingly, the AR workspace image (104) includes an image of the document in the first region of the AR workspace and the content of the document.

In one or more embodiments, the AR workspace comprises a second region with an AR output projection that may be based on the document in the first region. The AR output projection may comprise a text character, a non-text character, a string of text, a raster image, a vector image, a graph, or a table, but is not particularly limited to this content. In a non-limiting example, the AR output projection in the second region may comprise a content of the document in the first region and may be projected next to the document in the AR workspace. Accordingly, the AR workspace image (104) includes an image of the AR output projection in the second region of the AR workspace.

In one or more embodiments, the AR workspace includes both the first and second regions. The size and shape of the first and second regions are not particularly limited and may, for example, be mutually exclusive, partially overlap, or entirely overlap. Accordingly, the AR workspace image (104) may contain both real-world content (e.g., the document) and virtual content (e.g., the AR output projection) that may be mutually exclusive, partially overlap, or entirely overlap.

The AR workspace image (104) may be saved in the buffer (102) in any imaging format (e.g., a JPEG image, a GIF image, a bitmap image, a TIFF image, a PDF document).

The internal representation (106) may include a stored content. A stored content of the internal representation (106) may include a content of the AR workspace image (104) (e.g., a text character, a non-text character, a string of text, a raster image, a vector image, a graph, a table), a content of the document (i.e., an electronic copy of the document), a rendering of a content of the document (i.e., a rendered image of the document), a content of the AR output projection, a rendering of the AR output projection, a bi-level mask of the content of the AR output projection, or a spatial calibration of the AR workspace, but is not particularly limited to these items. In general, the internal representation (106) may comprise information to relate the digital form of the elements listed above to a physical version or a virtual version (e.g., projection) in the physical space occupied by the AR workspace.

The system (100) includes the imaging engine (108). The imaging engine (108) may be implemented in hardware (i.e., circuitry), software, or any combination thereof. The imaging engine (108) images an AR workspace to generate the AR workspace image (104).

Further, the imaging engine (108) may include a 2-dimensional and/or 3-dimensional imager (e.g., a camera, a combination of one or more cameras) that is able to capture a digital image of the AR workspace. The imaging engine (108) may continuously image the AR workspace. The imaging engine (108) may image the AR workspace at predetermined intervals, in response to predetermined conditions, or upon user request.

The system (100) further includes the parsing engine (110). The parsing engine (110) may be implemented in hardware (i.e., circuitry), software, or any combination thereof. The parsing engine (110) parses the AR workspace image (104) to extract a content to be included in the internal representation (106) and/or the AR output projection in the AR workspace.

The parsing engine (110) may perform an optical character recognition (OCR) or non-text content analysis to identify content within the AR workspace image (104) (e.g., a text character, a non-text character, a string of text, a raster image, a vector image, a graph, a table). Alternatively, the parsing engine (110) may segment the AR workspace image (104) into multiple regions. Any parsing program (e.g., a word recognition program, a table recognition program, an image recognition program) that is able to identify and format content within the AR workspace image (104) or segment the AR workspace image (104) may be utilized by the parsing engine (110).

The system (100) further includes the rendering engine (112). The rendering engine (112) may be implemented in hardware (i.e., circuitry), software, or any combination thereof. The rendering engine (112) renders the stored content of the internal representation (106) into digital images.

The rendering engine (112) may render a mask to mask the AR workspace image (104). The rendering engine (112) may render a rendering of an AR output projection to be projected onto the surface of the AR workspace (i.e., an output image). Further, the rendering engine (112) may render other images to provide information to the user. Any rendering program (e.g., a word processing program, an image processing program) that is able to render the stored content of the internal representation (106) may be utilized by the rendering engine (112).

The system (100) further includes the masking engine (114). The masking engine (114) may be implemented in hardware (i.e., circuitry), software, or any combination thereof. The masking engine (114) creates, based on the stored content of the internal representation (106), a bi-level mask for masking an AR workspace image (104). The masking engine (114) applies the bi-level mask to an AR workspace image (104) to eliminate portions of the AR workspace image (104).

In one or more embodiments, "eliminate" means to remove the masked portion of the masked image from consideration when the masked image is parsed by the parsing engine (110). The masked portion may be deleted from the image or set to a predetermined color or pixel value that the parsing engine (110) is configured to ignore, but is not particularly limited to these implementations.

The system (100) may include the display engine (116). The display engine (116) may be implemented in hardware (i.e., circuitry), software, or any combination thereof. The display engine (116) generates, using one or more lights, effects, and/or images, an AR output projection on the AR workspace.

The display engine (116) may include a 2-dimensional and/or 3-dimensional projector (e.g., a projector, a combination of one or more projectors) that is able to project a digital image onto the AR workspace. The display engine (116) may operate in an unrestricted color space in visible or non-visible wavelength regimes (e.g., ultraviolet, visible, near infrared, infrared). Therefore, the color, texture, or appearance of the AR workspace is not limited because the display engine (116) can compensate by using predetermined colors or patterns to distinguish the AR output projection from the AR workspace.

In response to the rendering engine (112) producing a rendering of an AR output projection, the display engine (116) may generate the AR output projection on the AR workspace. The AR output projection may include a stored content of the internal representation (106) (e.g., a text character, a non-text character, a string of text, a raster image, a vector image, a graph, a table). The AR output projection may include a virtual indicator (e.g., status indicator) or virtual control (e.g., button, scroll bar, switch, and knob) that facilitates user interaction with the AR workspace.

The AR output projection may be generated within a predetermined region of the AR workspace (e.g., the second region). The size and shape of the predetermined region may be determined by the display engine (116) or the rendering engine (112).

The display engine (116) works with the imaging engine (108) such that the system (100) can dynamically respond to changes in the AR workspace. Changes in the AR workspace may result from the real-world interactions with the AR workspace (e.g., user placing a document in the workspace) or may result from virtual interactions with the AR workspace (e.g., the system (100) changing the AR output projection).

The system (100) advantageously may ignore the changes caused by virtual interactions of the system (100) interacting with the AR workspace. Accordingly, the resources (e.g., memory and processing power) of the system (100) are more efficiently utilized to track and respond to changes caused by the real-world interactions within the AR workspace.

Although the system (100) is shown as having six components (102, 108, 110, 112, 114, and 116), in other embodiments of the invention, the system (100) may have more or fewer components. Furthermore, the functionality of each component described above may be shared among multiple components. In addition, each component (102, 108, 110, 112, 114, and 116) may be utilized multiple times in serial or parallel to carry out an iterative operation.

FIGS. 2A-2D show flowcharts in accordance with one or more embodiments of the invention. One or more of the steps in FIGS. 2A-2D may be performed by the system (100) of FIG. 1, as described above. One or more of the steps shown in FIGS. 2A-2D may be omitted, repeated, and/or performed in a different order that the order shown in FIGS. 2A-2D. Accordingly, the scope of the invention should not be limited by the specific arrangement as depicted in FIGS. 2A-2D.

Figure 2A:
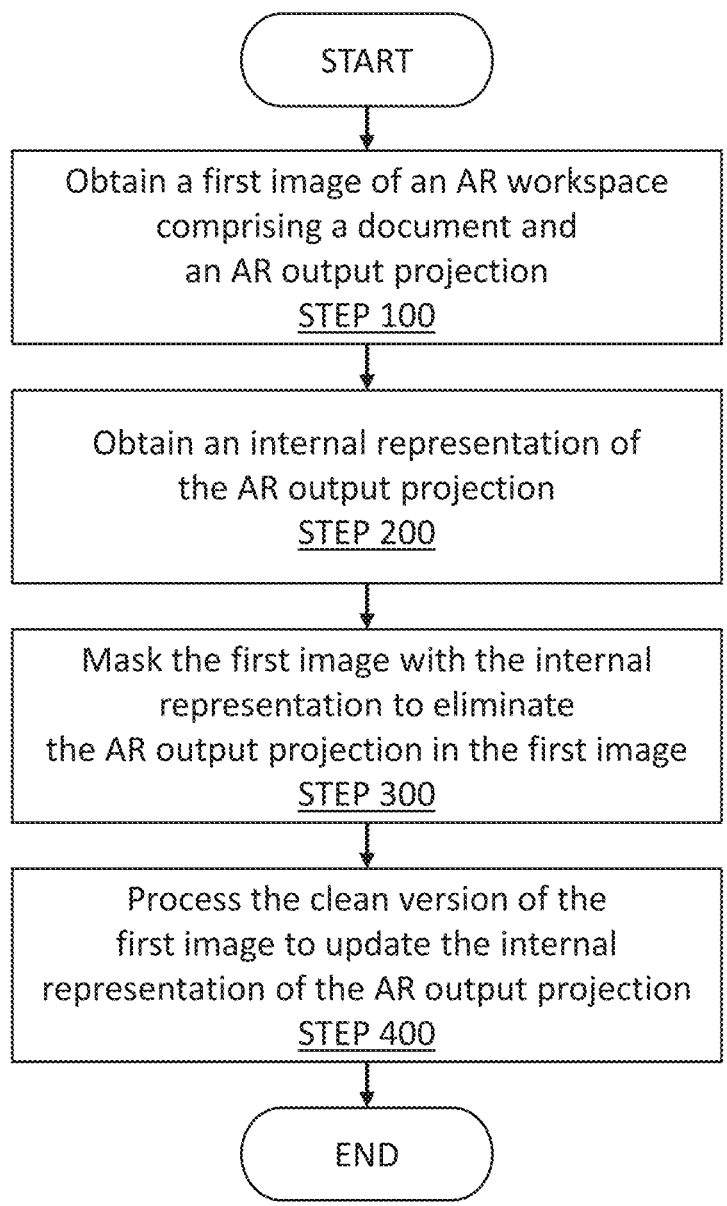

FIG. 2A shows a flowchart for processing an AR image to generate a clean version of the AR image in accordance with one or more embodiments of the invention.

In STEP 100, an image of an AR workspace (i.e., an AR workspace image) is obtained. The AR workspace image may comprise a document in a first region of the AR workspace and an AR output projection in a second region of the AR workspace. As discussed above, the AR workspace image may be an image obtained by the imaging engine (108).

In STEP 200, an internal representation of the AR output projection is obtained. The internal representation may comprise a mask of the AR output projection. As discussed above, the internal representation may be obtained from the buffer (102). Alternatively, the internal representation may be generated by the imaging engine (108), parsing engine (110), and/or rendering engine (112). This step is exemplified in more detail below, with respect to FIG. 2B.

In STEP 300, the AR workspace image is masked with the internal representation to eliminate the AR output projection in the AR workspace image and generate a clean version of the AR workspace image without the AR output projection.

As discussed above, masking the AR workspace image may be performed by the masking engine (114). This step is exemplified in more detail below, with respect to FIG. 2C.

In STEP 400, the clean version of the AR workspace image is processed to update the internal representation of the AR output projection. As discussed above, processing the clean version of the AR workspace image may be performed by the parsing engine (110). This step is exemplified in more detail below, with respect to FIG. 2D.

FIG. 2B shows a flowchart for obtaining the internal representation of the AR output projection in accordance with one or more embodiments of the invention.

In STEP 210, the system (100) determines whether to use a simple internal representation of the AR output project. The internal representation of the AR output projection may vary in specificity and may comprise simple or detailed representation of the AR output projection. The determination of the specificity of the internal representation may be controlled by the user or automatically determined by the system (100) (e.g., by the imaging engine (108) or parsing engine (110)).

When the determination in STEP 210 is NO (i.e., use a detailed internal representation), obtaining the internal representation of the AR output projection continues with STEP 220. This process is exemplified below in FIGS. 4A-4D.

In STEP 220, before the AR workspace image is obtained, an analysis image of the AR workspace is obtained by the imaging engine (108). An analysis image is an image that comprises a source material used to create the AR output projection (e.g., the document). Thus, in one or more embodiments described below, the AR workspace in the analysis image may comprise the document in the first region and the AR output projection is not projected in the second region.

In STEP 222, the parsing engine (110) parses the document in the first region and extracts a content from the analysis image (i.e., a content of the document) that may be stored in the internal representation of the AR output projection. The parsing engine (110) recognizes there is no content in the second region because there is no AR output projection in the second region of the analysis image. Accordingly, the parsing engine (110) does not utilize system resources (e.g., memory and processing power) to process the second region.

In STEP 224, the rending engine (112) creates, based on the extracted content, a rendering of the AR output projection that may be stored in the internal representation of the AR output projection. The rendering of the AR output projection and the internal representation of the AR output projection may be stored in the buffer (102).

In STEP 226, the display engine (116) projects the rendering of the AR output projection onto a surface of the second region of the AR workspace. Thus, the system (100) has obtained an internal representation of the AR output projection that is subsequently captured in the AR workspace image.

When the determination in STEP 210 is YES (i.e., use a simple internal representation), obtaining the internal representation of the AR output projection continues with STEP 230.

In STEP 230, the rendering engine (112) defines a mask boundary delimiting the second region of the AR workspace. The rendering engine (112) may obtain information about the second region from the buffer (102) or imagining engine (108) to identify the mask boundary of the second region.

In STEP 232, the rendering engine (112) creates the internal representation of the AR output projection based upon the mask boundary of the second region of the AR workspace. The process of STEP 230 and STEP 232 will now be described with respect to examples according to one or more embodiments of the invention.

In a non-limiting example, the system (100) may project a splash image onto a surface of the AR workspace upon startup. Therefore, the AR workspace image comprises a document in a first region of the AR workspace and the splash image in a second region of the AR workspace. Because the splash image is a known entity of the AR output projection that is produced by the system (100), it contains no content that needs to be extracted for use in the AR output projection. In other words, the content of the splash image may be previously stored in the internal representation (106) or the buffer (102).

The splash image may extend to the boundaries of the second region of the AR workspace. As discussed above, the second region may overlap the first region containing the document. In other words, the splash image may overlap the document and cover or obscure the content of the document. To prevent inaccurate parsing of the document and to conserve system resources, the system (100) may exclude the entire second region, including the area of the AR workspace covered by the splash image, from the parsing engine (110).

The rendering engine (112) may obtain information about the splash image from the buffer (102) to define the mask boundary such that it includes the entire splash image. Then, the rendering engine (112) creates the internal representation of the AR output projection (i.e., internal representation of the splash image).

In another non-limiting example, the system (100) may only use the first region of the AR workspace. In other words, the imaging engine (108) may only obtain and parse an image of a first region. Alternatively, the imaging engine (108) may obtain an image of both the first region and the second region, but the masking engine (114) may mask everything outside of the first region (i.e., only a predetermined input area is considered by the parsing engine (110)).

Figure 2C:
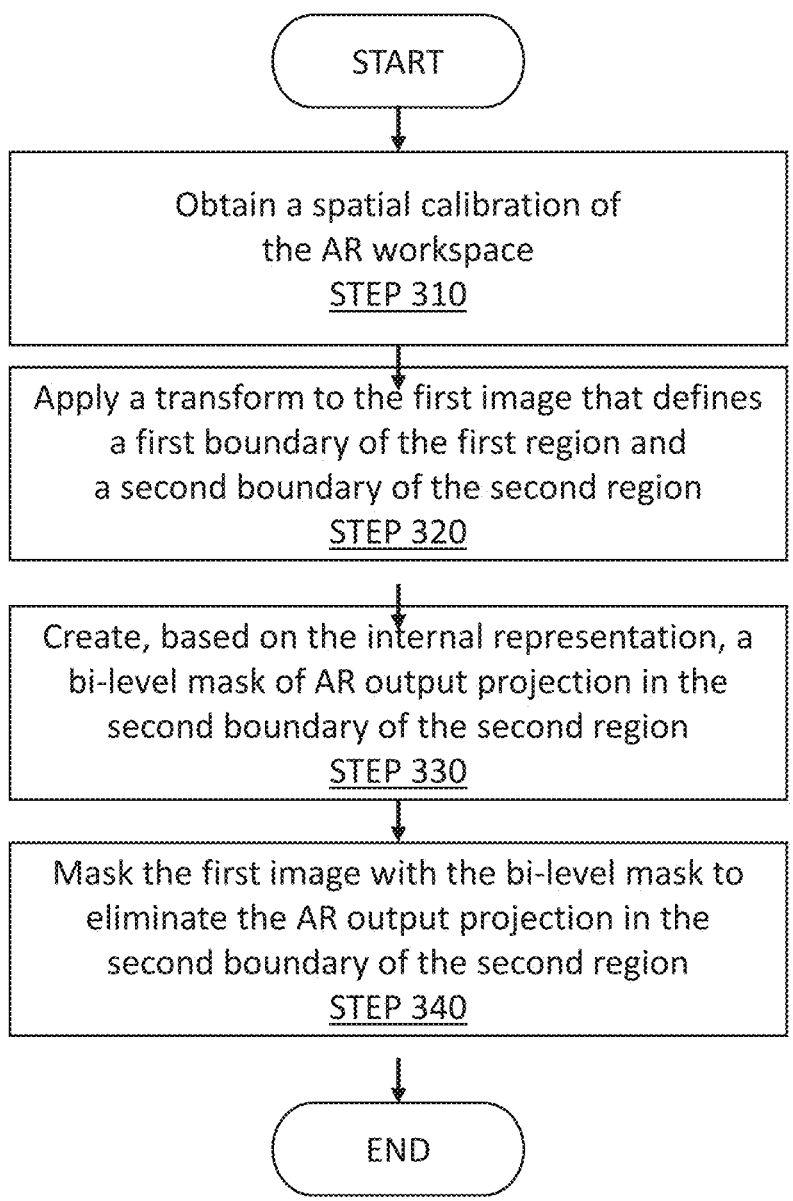

FIG. 2C shows a flowchart for masking the AR workspace image with the internal representation to eliminate the AR output projection in the AR workspace image and create a clean version of the AR workspace image in accordance with one or more embodiments of the invention.

In STEP 310, the rendering engine (112) obtains a spatial calibration of the AR workspace. The spatial calibration includes a transform that maps an obtained image to the physical space occupied by the AR workspace. The spatial calibration ensures the second region containing the AR output projection is properly correlated (i.e., aligned or registered) to obtained images of the AR workspace.

In one or more embodiments, the spatial calibration may be obtained by the imaging engine (108), display engine (116), and/or rendering engine (112). For example, the display engine (116) may project a known image with fiducial markings (e.g., a calibration pattern) onto the AR workspace. The imaging engine (108) may capture a calibration image of the AR workspace including the fiducial markings that may be deformed by the surface features of the AR workspace. Based on the deformation of the fiducial markings, the rendering engine (112) may create the transform that maps the known image to the physical space occupied by the AR workspace and store the transform in the buffer (102).

Alternatively, in one or more embodiments, the spatial calibration may be stored in the buffer (102) based upon a predetermined spatial configuration of the system (100) with respect to the AR workspace.

Further, the method of obtaining the spatial calibration is not limited to the embodiments described herein and those skilled in the art will appreciate that the method may be any method that provides a transform to accurately align or register the captured images and projected images of the system (100).

In STEP 320, the masking engine (114) applies the transform, based on the spatial calibration of the AR workspace, to the AR workspace image to define a first boundary of the first region and a second boundary of the second region in the AR workspace image. In other words, the AR workspace image is mapped (i.e., registered) to the geometry of the physical space occupied by the AR workspace. A first boundary of the first region may be a boundary delimiting the entire first region or may be a boundary delimiting a spatial extent of the document in the first region, but is not particularly limited to these examples. A second boundary of the second region may be a boundary delimiting the entire second region or may be a boundary delimiting a spatial extent of the AR output projection in the second region, but is not particularly limited to these examples.

In STEP 330, the masking engine (114) creates, based on the internal representation of the AR output projection, a bi-level mask of the AR output projection in the second boundary of the second region of the AR workspace image. For example, the internal representation (e.g., a rendering of the AR output projection) identifies which areas or pixels of the AR workspace image would contain the AR output projection. The bi-level mask may vary in specificity depending on the content of the AR output projection (e.g., masking of a text character, a non-text character, a string of text, a raster image, a vector image, a graph, a table, a document, a region).

The bi-level mask may be a binary image, a single channel image, or any type of image that identifies the AR output projection to be eliminated from the AR workspace image. The bi-level mask may be saved in the buffer (102) in any imaging format (e.g., a JPEG image, a GIF image, a bitmap image, a TIFF image, a PDF document).

In one or more embodiments, the creation of the bi-level mask of the AR output projection is further or alternatively based on a portion of the AR output projection in the AR workspace image that varies in color according to a predetermined pattern. For example, the display engine (116) may project the AR output projection onto the AR workspace using one or more colors that varies according to a predetermined pattern in time or space.

In one or more embodiments, parsing (e.g., filtering) the AR workspace image for the color or colors used by the predetermined pattern of the AR output projection may identify areas or pixels of the AR workspace image to include in the bi-level mask. The filtering of the image may be adapted to a wider range of colors than the colors used in the predetermined pattern to account for discrepancies between the colors projected by the display engine (116) and the colors captured by the imaging engine (108) (e.g., lensing or chromatic aberration caused by different optical characteristics of the various hardware in the system (100)).

Further, in one or more embodiments, the imaging engine (108) may identify a suitable color or pattern for the predetermined pattern by selecting a color or pattern that does not appear in the AR workspace or has high contrast with the physical space occupied by the AR workspace. Accordingly, filtering the predetermined pattern from the AR workspace image is easier to achieve and requires fewer system resources.

In STEP 340, the masking engine (114) masks the AR workspace image with the bi-level mask to eliminate the AR output projection in the second boundary of the second region. The resulting clean version of the AR workspace image does not contain the AR output projection.

In one or more embodiments, after masking the AR workspace image, the masking engine (114) identifies and removes artifacts in the clean version of the AR workspace image.

For example, warping or distortion of the AR output projection (e.g., by movement or vibration of the AR workspace or system (100)) may introduce an offset between the AR output projection and the internal representation of the AR output projection. Accordingly, after the bi-level mask is applied, some areas or pixels of the AR output projection (i.e., the artifacts) would remain in the clean version of the AR workspace image. In one or more embodiments, the masking engine (114) applies a "morphological close" operation to eliminate the artifacts from the clean version of the AR workspace image. In one or more embodiments, the masking engine (114) may expand or dilate the bi-level mask to eliminate the artifacts from the clean version of the AR workspace image. Further, multiple operations (e.g., a "morphological close" operation, inpainting, median filter, mean filter, and Gaussian blur) may be performed multiple times in series or parallel to eliminate all artifacts from the clean version of the AR workspace image.

In one or more embodiments, the masking engine (114) may use a simple or detailed internal representation of the AR output projection. In a non-limiting example, the system (100) projects a splash image that may fill or partially fill the second region of the AR workspace. Accordingly, the masking engine (114) may mask an area corresponding to a mask boundary that delimits the second region of the AR workspace instead of masking individual content within the splash image.

FIG. 2D shows a flowchart for processing the clean version of the AR workspace image to update the AR output projection and the internal representation of the AR output projection in accordance with one or more embodiments of the invention.

In STEP 410, the parsing engine (110) parses the clean version of the AR workspace image and extracts a content from the clean version of the AR workspace image (e.g., a content of the document in the first region of the clean version of the AR workspace image). Because the AR output projection has been eliminated from the clean version of the AR workspace image, the extracted content of the clean version of the AR workspace image does not contain the content of the AR output projection.

In STEP 420, the system (100) determines whether to reset the internal representation of the AR output projection. Because the stored content of the internal representation of the AR output projection may already include some of the extracted content of the clean version of the AR workspace image, it is advantageous to ensure that stored content of the internal representation is not duplicated. This can be achieved by resetting the stored content of the internal representation (i.e., replacing all of the content) or by comparing and selectively updating the stored content of the internal representation (i.e., searching the prior stored content and removing duplicate data from the extracted content).

When the determination in STEP 420 is NO (i.e., do not reset the internal representation), processing the clean version of the AR workspace image continues with STEP 430.

In STEP 430, the parsing engine (110) compares the extracted content of the clean version of the AR workspace image with the stored content of the internal representation of the AR output workspace.

In STEP 432, the parsing engine (110) determines whether the extracted content of the clean version of the AR workspace image and the stored content of the internal representation of the AR output workspace are different.

When the determination in STEP 432 is NO (i.e., the parsing engine (110) determines that there are no differences between the extracted content of the clean version of the AR workspace image and the stored content of the internal representation of the AR output projection), the processing of the clean version of the AR workspace image is complete. In other words, if no changes have been made to the AR workspace that require an update to the AR output projection or internal representation of the AR output projection, the processing of the clean version of the AR workspace image is complete.

When the determination in STEP 432 is YES (i.e., the parsing engine (110) determines that there are differences between the extracted content of the clean version of the AR workspace image and the stored content of the internal representation of the AR output projection), processing the clean version of the AR workspace image continues with STEP 434.

In STEP 434, the system (100) updates the stored content of the internal representation of the AR output projection and AR output projection based on the extracted content of the clean version of the AR workspace image. Accordingly, the updated internal representation may be used to update the bi-level mask of AR output projection.

In a non-limiting example, the extracted content of the clean version of the AR workspace image includes new content (e.g., a new marking or alteration to the document in the first region) that will be added to the AR output projection. The parsing engine (110) may update the internal representation to include the new content (e.g., a character or text string obtained by OCR, an image, a table). The rendering engine (112) may add a rendering of the new content to the rendering of the AR output projection (i.e., to be subsequently projected by display engine (116)) and to the bi-level mask (i.e., to be masked from a subsequently obtained image by masking engine (114)).

In a non-limiting example, the extracted content of the clean version of the AR workspace image is missing an element that is included in the stored content of the internal representation of the AR output projection (e.g., a marking on the document in the first region that the user wants to remove from the AR output projection). The parsing engine (110) may update the internal representation of the AR output projection to remove a stored content that corresponds to the missing element. The rendering engine (112) may remove a rendering of the missing element from the rendering of the AR output projection and from the bi-level mask (i.e., the bi-level mask of the subsequent AR output projection will not include the missing element).

When the determination in STEP 420 is YES (i.e., reset the internal representation), processing the clean version of the AR workspace image continues with STEP 440.

In STEP 440, the parsing engine (110) replaces a stored content of the internal representation of the AR output projection with the extracted content of the clean version of the AR workspace image.

Accordingly, after processing of the clean version of the AR workspace image, the internal representation of the AR output projection, the bi-level mask, and the AR output projection will update in tandem such that the AR output projection can be accurately eliminated from obtained images of the AR workspace as the user interacts with the AR workspace. In one or more embodiments, the internal representation of the AR output projection, the bi-level mask, and the AR output projection may be updated based on a user interaction with the system (100) that is not in the AR workspace (e.g., user input from a connected computing system).

In one or more embodiments, the system (100) includes a Projection with Interactive Capture (PIC) device that comprises an imager and a projector. The imaging engine (108) includes the imager that obtains the AR workspace image. The display engine (116) includes the projector that projects the AR output projection onto a surface of the AR workspace.

FIGS. 3A-3E show an implementation example in accordance with one or more embodiments of the invention.

Figure 3A:
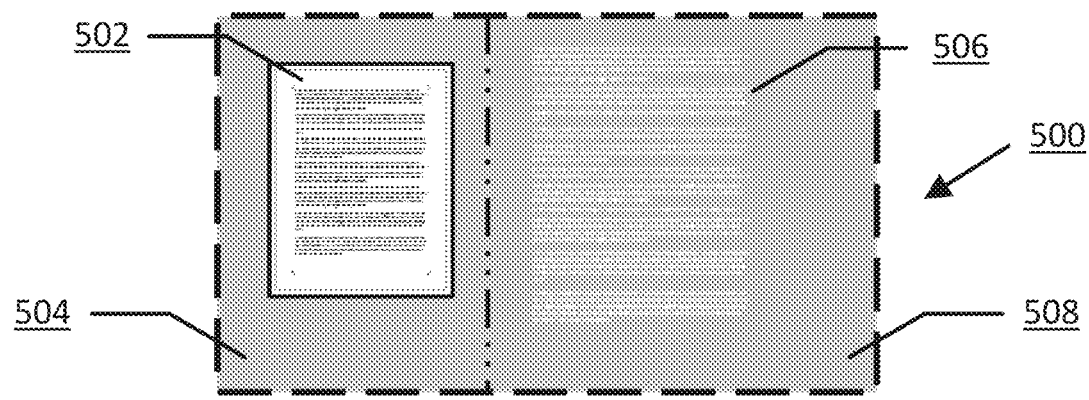
FIGS. 3A-3E show an implementation example in accordance with one or more embodiments of the invention.
Figure 4A:
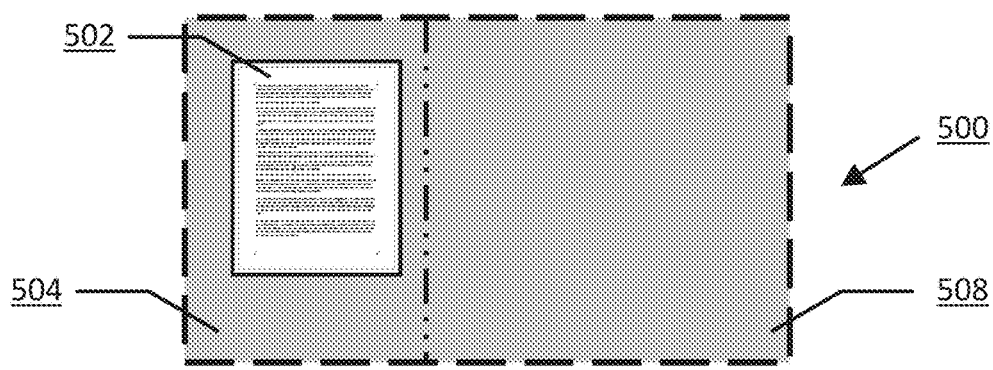
FIGS. 4A-4D show an implementation example in accordance with one or more embodiments of the invention.

FIG. 3A shows an AR workspace (500) in accordance with one or more embodiments of the invention. As discussed above, the AR workspace (500) may be a surface of any type and may comprise multiple work surfaces, irregular surfaces, or spatially separated surfaces. Although, FIGS. 3A and 4A depict a rectangular shape, the AR workspace (500) is not particularly limited to any size, shape, or number of shapes. The AR workspace (500) is denoted by a dashed line.

In one or more embodiments, a document (502) is disposed within a first region (504) of the AR workspace (500). Although, FIGS. 3A and 4A depict the document (502) with only a text content, as discussed above, the content of the document (502) is not limited to only text. The document (502) may include other types of content (e.g., a non-text character, a raster image, a vector image, a graph, a table).

In one or more embodiments, an AR output projection (506) is projected within a second region (508) of the AR workspace (500) by a projector. Although, FIGS. 3A and 4A depict the AR output projection (506) with only a text content, as discussed above, the content of the AR output projection (506) is not limited to only text. The AR output projection (506) may include other types of content (e.g., a non-text character, a raster image, a vector image, a graph, a table). Further, the AR output projection (506) may not be an exact reproduction of the document (502) and may include additional content, less content, or entirely different content.

Although first region (504) and second region (508) of the AR workspace (500) are depicted with rectangular shapes, the first region (504) and second region (508) of the AR workspace (500) are not particularly limited to any size, shape, or location within the AR workspace (500). Accordingly, the dot-dashed line denoting a boundary between the first region (504) and second region (508) does not limit the shape or extent of the first region (504) and the second region (508) of the AR workspace (500).

Figure 3B:
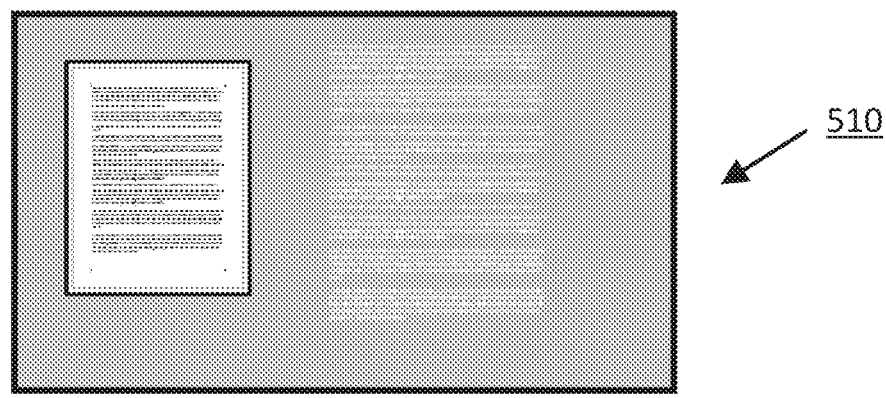

FIG. 3B shows an AR workspace image (510) of the AR workspace (500) in accordance with one or more embodiments of the invention. Although, FIGS. 3B, 3D, and 3E depict images with a rectangular shape, images of the AR workspace (500) are not particularly limited to any size, shape, or number of images. Images of the AR workspace (500) are denoted by a solid line.

In one or more embodiments, the AR workspace image (510) of the AR workspace (500) includes a portion that corresponds to the document (502) in the first region (504) of the AR workspace (500) and a portion that corresponds to the AR output projection (506) in the second region (508) of the AR workspace (500).

Figure 3C:
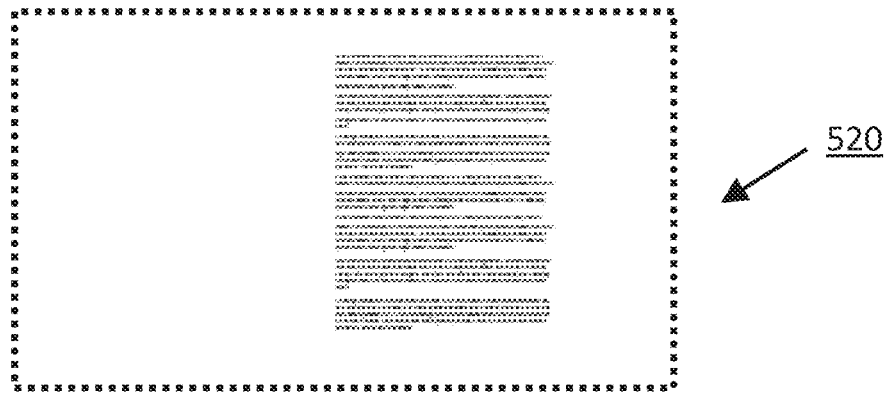
Figure 3D:
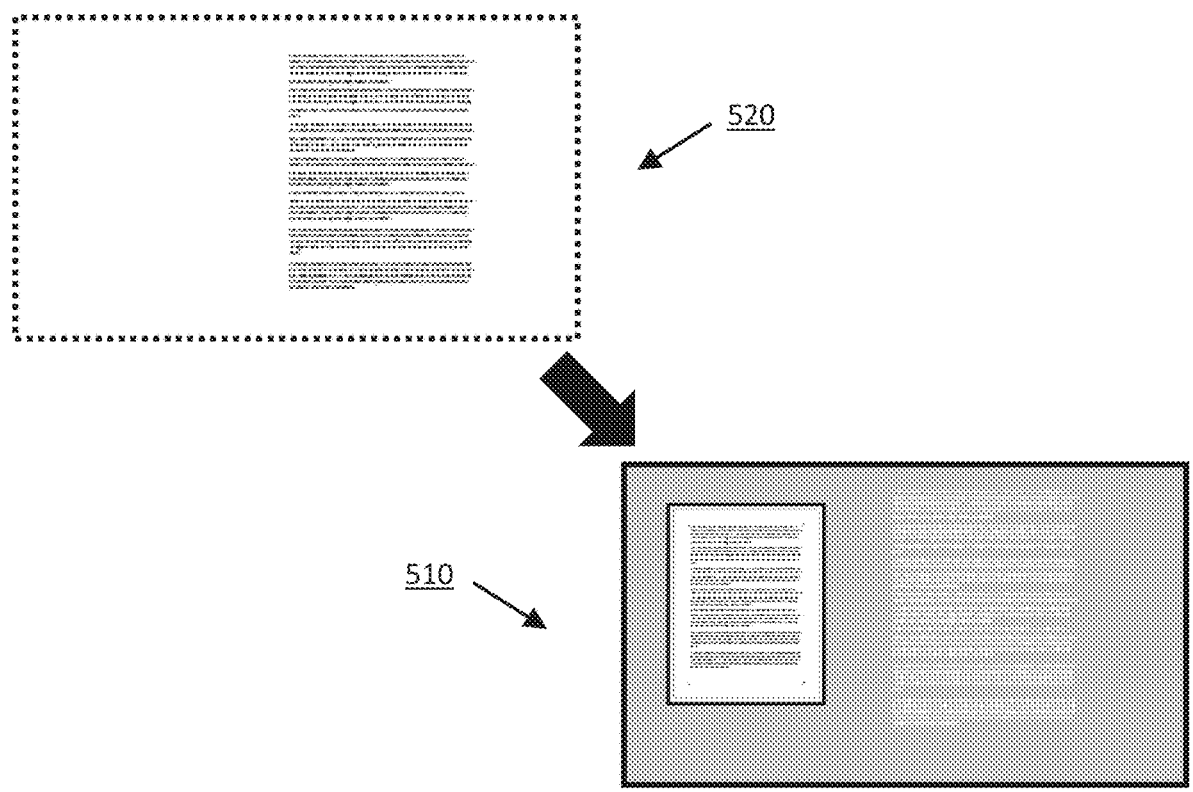
Figure 3E:
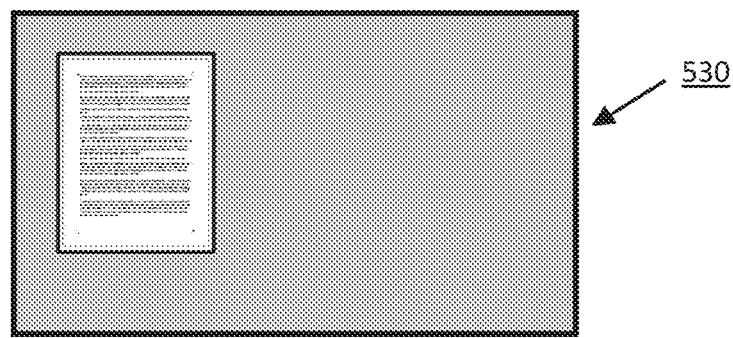

FIG. 3C shows an internal representation (520) of the AR output projection (506) in accordance with one or more embodiments of the invention. Although, FIGS. 3C, 3D, and 4C depict the internal representation (520) as a 2-dimensional rectangular image, the internal representation (520) is not particularly limited to a single image. For example, the internal representation (520) may include multiple images, 2- or 3-dimensional renderings, digital content (e.g., a text character, a non-text character, a string of text, a raster image, a vector image, a graph, a table), a spatial calibration of the AR workspace (500), and/or a bi-level mask of the AR output projection (506). The internal representation (520) of the AR output projection (506) is denoted by a dotted line.

FIG. 3D shows the internal representation (520) of the AR output projection (506) being applied to the AR workspace image (510) of the AR workspace (500) in accordance with one or more embodiments of the invention. The spatial calibration and transform applied to the AR workspace image (510) ensure that the internal representation (520) of the AR output projection (506) is accurately aligned with the AR workspace image (510).

FIG. 3E shows a clean version of the AR workspace image (530) of the AR workspace (500) in accordance with one or more embodiments of the invention. The clean version of the AR workspace image (530) of the AR workspace (500) includes a portion that corresponds to the document (502) in the first region (504) of the AR workspace (500). However, the AR output projection (506) has been eliminated from the portion of the clean version of the AR workspace image (530) that corresponds to the second region (508) of the AR workspace (500). Accordingly, the clean version of the AR workspace image (530) of the AR workspace (500) can be processed without the AR output projection (506) recursively being included as input for updating the AR output projection (506) (i.e., prevent a visual echo in the AR output projection (506)).

In a comparative example of an AR system that does not remove the AR output projection, an image of an AR workspace would include the document and the AR output projection based on the document. Accordingly, when the comparative system extracts content from the image, the comparative system may extract duplicates of the same content (i.e., one copy from the document and a second copy from the AR output projection). This wastes system resources (e.g., memory). Further, the AR output projection may be updated to include the duplicated content. Without eliminating the AR output projection from the image, the positive feedback loop cannot be broken, and the comparative system would endlessly duplicate the content (i.e., creating a visual echo in the AR output projection).

FIGS. 4A-4D show an implementation example of obtaining the internal representation of the AR output projection in accordance with one or more embodiments of the invention.

FIG. 4A shows an AR workspace (500) in accordance with one or more embodiments of the invention. The AR workspace (500) comprises the document (502) in the first region (504) and the AR output projection is not projected in the second region (508). In other words, there is no AR output projection (506) to eliminate.

Figure 4B:
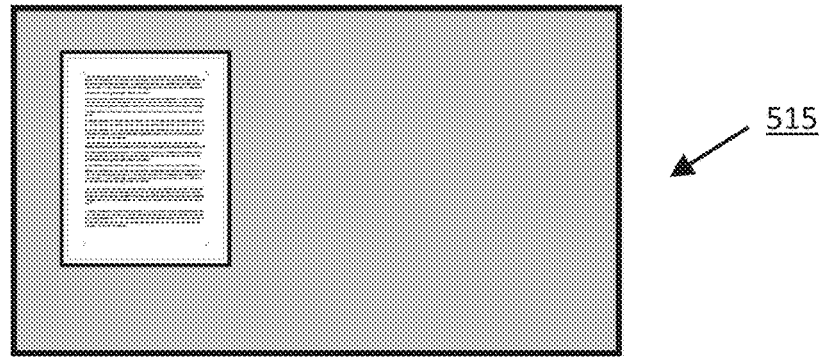
Figure 4C:
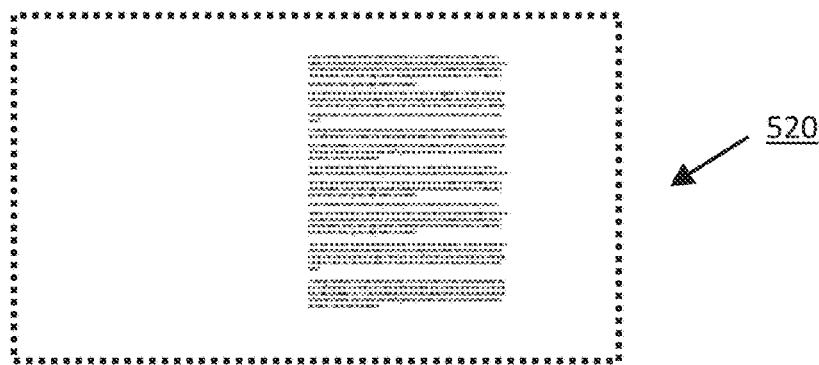

FIG. 4B shows a analysis image (515) of the AR workspace (500) in accordance with one or more embodiments of the invention. The analysis image (515) of the AR workspace (500) includes the document (502) in the first region (504) of the AR workspace (500). The analysis image (515) of the AR workspace (500) does not include an AR output projection (506) in the second region of the AR workspace (500). The analysis image (515) may be obtained before an AR output projection is created (e.g., before the AR workspace image (510) is obtained) or after the AR output projection is created (e.g., any time while the AR output projection is not projected on the AR workspace (500)).

FIG. 4C shows the internal representation (520) of the AR output projection (506) in accordance with one or more embodiments of the invention. The internal representation (520) of the AR output projection (506) may be created based on the extracted content of the analysis image (515) obtained in FIG. 4B. The internal representation (520) of the AR output projection (506) may be stored in a memory or buffer for subsequent use.

Figure 4D:
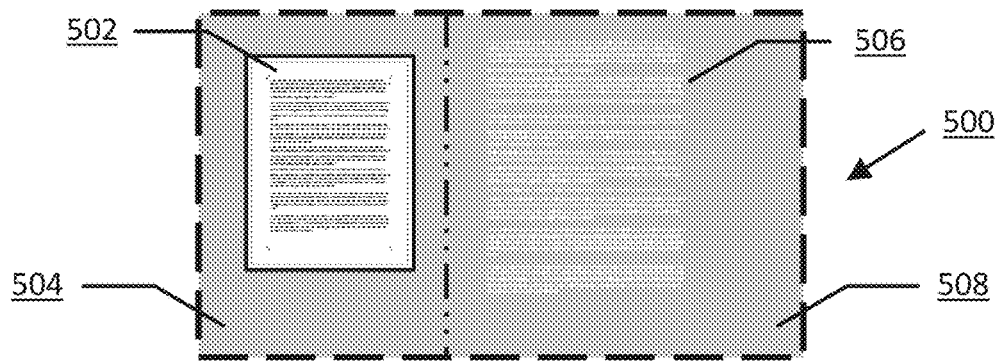

FIG. 4D shows the AR workspace (500) in accordance with one or more embodiments of the invention. A rendering of the internal representation (520) obtained in FIG. 4C may be projected, as the AR output projection (506), onto the surface of the second region (508) of the AR workspace (500). Accordingly, when an AR workspace image (510) of AR workspace (500) in FIG. 4D is obtained, the internal representation (520) of the AR output projection (506) has already been generated.

Figure 5:
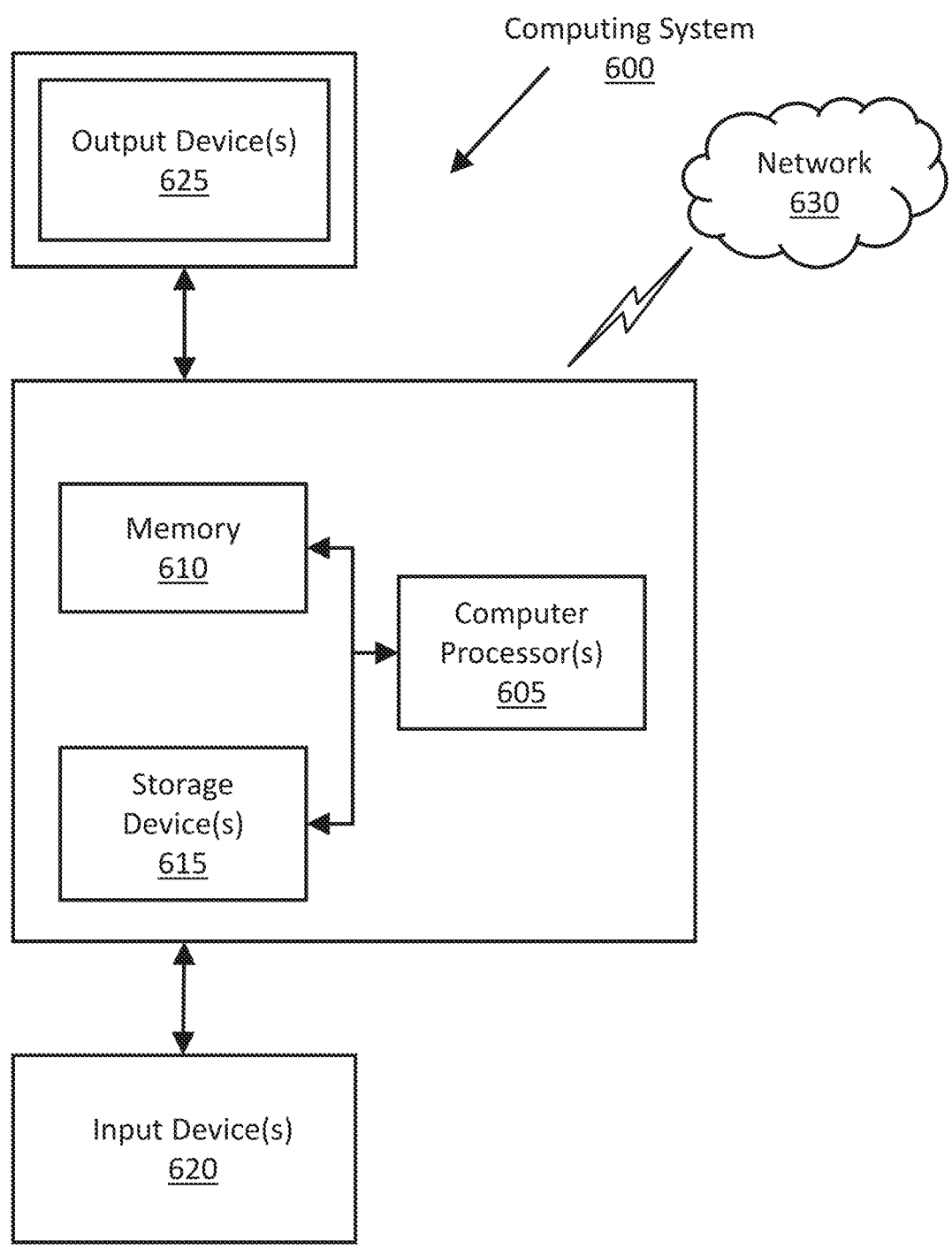
FIG. 5 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (600) may include one or more computer processor(s) (605), associated memory (610) (e.g., random access memory (RAM), cache memory, flash memory), one or more storage device(s) (615) (e.g., a hard disk, an optical drive such as a compact disk (CD) drive or digital versatile disk (DVD) drive, a flash memory stick), and numerous other elements and functionalities. The computer processor(s) (605) may be an integrated circuit for processing instructions. For example, the computer processor(s) may be one or more cores, or micro-cores of a processor. The computing system (600) may also include one or more input device(s) (620), such as a camera, imager, touchscreen, keyboard, mouse, microphone, touchpad, electronic pen, or any other type of input device. Further, the computing system (600) may include one or more output device(s) (625), such as a projector, screen (e.g., a liquid crystal display (LCD), a plasma display, touchscreen, cathode ray tube (CRT) monitor, or other display device), a printer, external storage, or any other output device. One or more of the output device(s) may be the same or different from the input device(s). The computing system (600) may be connected to a network (630) (e.g., a local area network (LAN), a wide area network (WAN) such as the Internet, mobile network, or any other type of network) via a network interface connection (not shown). The input and output device(s) may be locally or remotely (e.g., via the network (630)) connected to the computer processor(s) (605), memory (610), and storage device(s) (615). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and be connected to the other elements over a network (630). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One or more of the embodiments of the invention may have one or more of the following advantages: the ability to discriminate against including, within an image captured by the system, information that was projected by the same system; the ability to suppress a visual echo by immediately eliminating an AR output projection from an AR workspace image (i.e., projected AR information does not affect interactions within the AR workspace); the ability to eliminate an AR output projection from an AR workspace image based on an internal representation (i.e., no user intervention, no requirement for a "green screen"); the ability to decrease utilization of system resources (i.e., no requirement to maintain a "history" of previous images to subtract from each obtained image); the ability to create an AR workspace that is continuously updated and conveyed in real-time (i.e., updating the AR output projection to include new information is less obvious or seamless to the user); the ability to project the AR output projection and image the AR workspace concurrently and in real-time (i.e., no complex synchronization requiring the projection and image capture steps to be rapidly switched (temporally out of phase) which causes discomfort if noticed by the user); the ability to project and image the AR output projection without a complex or restricted color filter system (i.e., no additional hardware or color filters to eliminate the AR output projection).

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method for processing an augmented reality (AR) image, the method comprising:
   projecting a rendering of an AR output projection onto a surface of an AR workspace with a projector;
   obtaining, after projecting the AR output projection, an AR workspace image of the AR workspace with a camera, wherein the AR workspace in the AR workspace image comprises:
   a document in a first region of the AR workspace; and
   the AR output projection in a second region of the AR workspace;
   obtaining an internal representation of the AR output projection;

masking the AR workspace image of the AR workspace with the internal representation to eliminate the AR output projection in the AR workspace image; and generating, in response to masking the AR workspace image of the AR workspace, a clean version of the AR workspace image in which the AR output projection is eliminated.

2. The method of claim 1, wherein obtaining the internal representation of the AR output projection comprises:

obtaining, before obtaining the AR workspace image, an analysis image of the AR workspace, wherein the AR workspace in the analysis image comprises the document in the first region and the AR output projection is not projected in the second region;

parsing the document and extracting a content from the analysis image of AR workspace; and creating, based on the extracted content, the rendering of the AR output projection and the internal representation of the AR output projection.

3. The method of claim 1, wherein obtaining the internal representation of the AR output projection comprises defining a mask boundary delimiting the second region of the AR workspace.

4. The method of claim 1, wherein masking the AR workspace image of the AR workspace comprises:

applying a transform, based on a spatial calibration of the AR workspace, to the AR workspace image that defines a first boundary of the first region and a second boundary of the second region in the AR workspace image;

creating, based on the internal representation of the AR output projection, a bi-level mask of the AR output projection in the second boundary of the second region; and masking the AR workspace image with the bi-level mask to eliminate the AR output projection in the second boundary of the second region.

5. The method of claim 4, wherein creation of the bi-level mask of the AR output projection is further based on a portion of the AR output projection in the AR workspace image that varies in color according to a predetermined pattern.

6. The method of claim 4, further comprising:

identifying and eliminating, after masking of the AR workspace image, artifacts in the clean version of the AR workspace image.

7. The method of claim 1, wherein an area corresponding to a mask boundary that delimits the second region of the AR workspace is masked.

8. The method of claim 1, further comprising:

parsing the clean version of the AR workspace image and extracting a content of the clean version of the AR workspace image;

comparing the extracted content of the clean version of the AR workspace image with a stored content of the internal representation of the AR output projection; and updating, in response to determining the extracted content of the clean version of the AR workspace image and the stored content of the internal representation of the AR output projection are different, the stored content of the internal representation of the AR output projection based on the extracted content of the clean version of the AR workspace image.

9. The method of claim 1, further comprising:

parsing the clean version of the AR workspace image and extracting a content of the clean version of the AR workspace image; and replacing a stored content of the internal representation of the AR output projection with the extracted content of the clean version of the AR workspace image.

10. The method of claim 1, wherein the AR workspace image of the AR workspace is obtained using a Projection with Interactive Capture (PIC) device that comprises an imager and a projector, and the AR output projection is projected onto a surface of the second region of the AR workspace by the projector.

11. A non-transitory computer readable medium (CRM) storing computer readable program code for processing an augmented reality (AR) image, the computer readable program code causes a computer to:

project a rendering of an AR output projection onto a surface of an AR workspace;

obtain, after projecting the AR output projection, an AR workspace image of the AR workspace, wherein the AR workspace in the AR workspace image comprises: a document in a first region of the AR workspace; and the AR output projection in a second region of the AR workspace;

obtain an internal representation of the AR output projection;

mask the AR workspace image of the AR workspace with the internal representation to eliminate the AR output projection in the AR workspace image; and generate, in response to masking the AR workspace image of the AR workspace, a clean version of the AR workspace image in which the AR output projection is eliminated.

12. The CRM of claim 11, wherein the computer readable program code further causes the computer to:

obtain, before obtaining the AR workspace image, an analysis image of the AR workspace, wherein the AR workspace in the analysis image comprises the document in the first region and the AR output projection is not projected in the second region;

parse the document and extract a content from the analysis image of AR workspace; and create, based on the extracted content, the rendering of the AR output projection and the internal representation of the AR output projection.

13. The CRM of claim 11, wherein the computer readable program code further causes the computer to:

apply a transform, based on a spatial calibration of the AR workspace, to the AR workspace image that defines a first boundary of the first region and a second boundary of the second region in the AR workspace image;

create, based on the internal representation of the AR output projection, a bi-level mask of the AR output projection in the second boundary of the second region; and mask the AR workspace image with the bi-level mask to eliminate the AR output projection in the second boundary of the second region.

14. The CRM of claim 11, wherein the computer readable program code further causes the computer to:

parse the clean version of the AR workspace image and extract a content of the clean version of the AR workspace image;

compare the extracted content of the clean version of the AR workspace image with a stored content of the internal representation of the AR output projection; and update, in response to determining the extracted content of the clean version of the AR workspace image and the stored content of the internal representation of the AR output projection are different, the stored content of the internal representation of the AR output projection based on the extracted content of the clean version of the AR workspace image.

15. The CRM of claim 11, wherein
the AR workspace image of the AR workspace is obtained using a Projection with Interactive Capture (PIC) device that comprises an imager and a projector,
the computer readable program code controls the PIC device, and
the AR output projection is projected onto a surface of the second region of the AR workspace by the projector.

16. A system for processing an augmented reality (AR) image, the system comprising:
a memory; and
a processor coupled to the memory, wherein the processor:
projects a rendering of an AR output projection onto a surface of an AR workspace;
obtains, after projecting the AR output projection, an AR workspace image of the AR workspace, wherein the AR workspace in the AR workspace image comprises:
a document in a first region of the AR workspace; and
the AR output projection in a second region of the AR workspace;
obtains an internal representation of the AR output projection;
masks the AR workspace image of the AR workspace with the internal representation to eliminate the AR output projection in the AR workspace image; and
generates, in response to masking the AR workspace image of the AR workspace, a clean version of the AR workspace image in which the AR output projection is eliminated.

17. The system of claim 16, wherein the processor further:
obtains, before obtaining the AR workspace image, an analysis image of the AR workspace, wherein the AR workspace in the analysis image comprises the document in the first region and the AR output projection is not projected in the second region;
parses the document and extracts a content from the analysis image of AR workspace; and
creates, based on the extracted content, the rendering of the AR output projection and the internal representation of the AR output projection.

18. The system of claim 16, wherein the processor further:
applies a transform, based on a spatial calibration of the AR workspace, to the AR workspace image that defines a first boundary of the first region and a second boundary of the second region in the AR workspace image;
creates, based on the internal representation of the AR output projection, a bi-level mask of the AR output projection in the second boundary of the second region; and
masks the AR workspace image with the bi-level mask to eliminate the AR output projection in the second boundary of the second region.

19. The system of claim 16, wherein the processor further:
parses the clean version of the AR workspace image and extracts a content of the clean version of the AR workspace image;
compares the extracted content of the clean version of the AR workspace image with a stored content of the internal representation of the AR output projection; and
updates, in response to determining the extracted content of the clean version of the AR workspace image and the stored content of the internal representation of the AR output projection are different, the stored content of the internal representation of the AR output projection based on the extracted content of the clean version of the AR workspace image.

20. The system of claim 16, wherein
the AR workspace image of the AR workspace is obtained using a Projection with Interactive Capture (PIC) device that comprises an imager and a projector,
the PIC device is controlled by the processor, and
the AR output projection is projected onto a surface of the second region of the AR workspace by the projector.

* * * * *